UNITED STATES PATENT OFFICE.

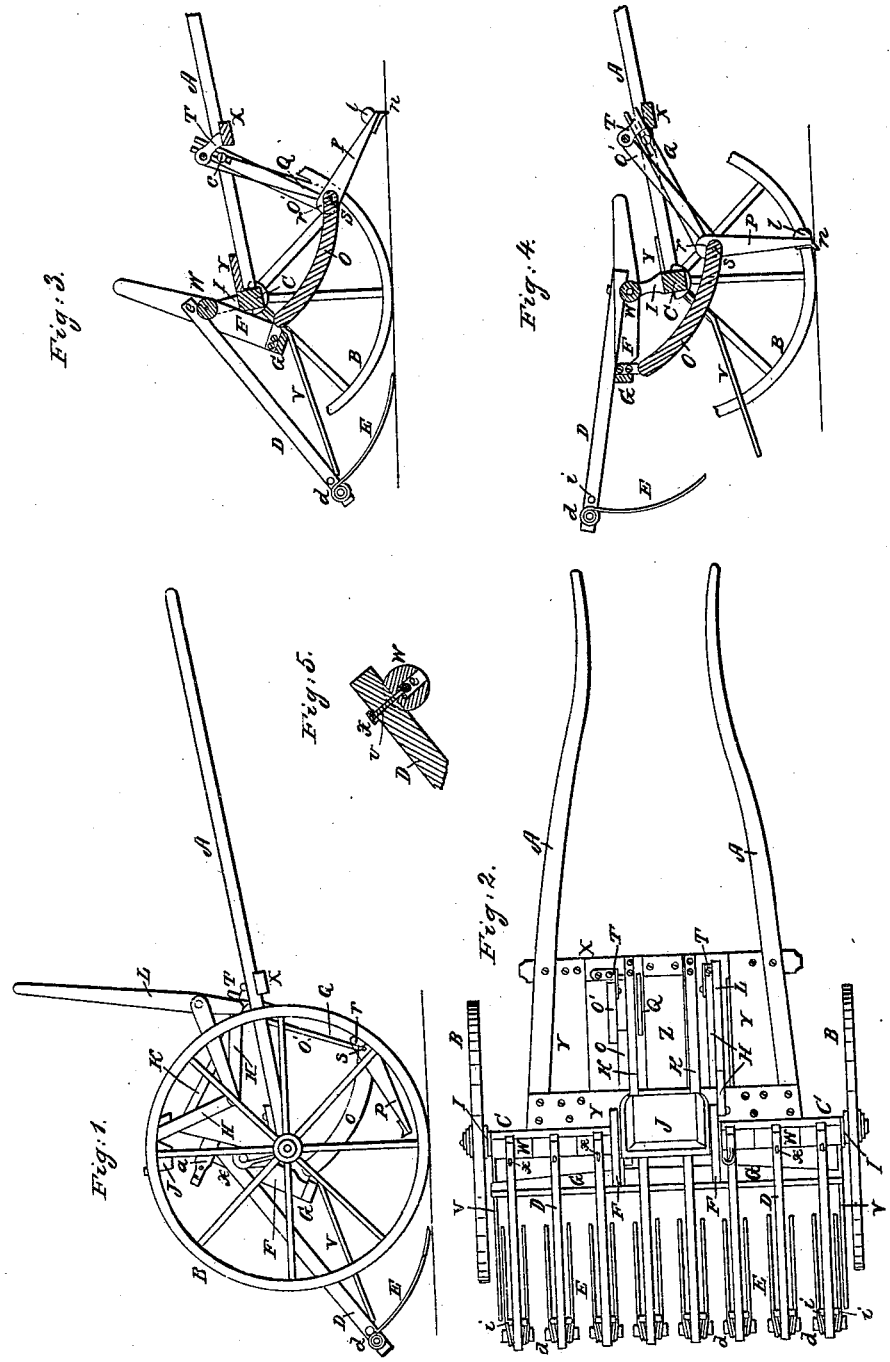

GEORGE E. BURT, OF HARVARD, MASSACHUSETTS.

IMPROVEMENT IN HORSE-RAKES.

Specification forming part of Letters Patent No. 50,557, dated October 24, 1865.

*To all whom it may concern:*

Be it known that I, GEORGE E. BURT, of Harvard, in the county Worcester, in the State of Massachusetts, have invented new and useful Improvements in Horse-Rakes; and I do hereby declare that the following is a full and exact description thereof, reference being had to the accompanying drawings, and to the letters of reference marked thereon, in which—

Figure 1 is a side elevation. Fig. 2 is a bird's-eye view. Fig. 3 is a longitudinal vertical section, showing the position of the rake teeth and arms, the elevating-bar, connecting-bars, elevator, and pitman in position to rake. Fig. 4 is a vertical longitudinal section, showing the same parts as Fig. 3, with the rake elevated in position to discharge and pass over the hay. Fig. 5 is a section of a tooth-arm and cylinder, showing the method of attaching the arm to the cylinder.

Like letters represent like parts in all the figures.

The nature of my invention consists in constructing horse-rakes in such a manner that they may be easily operated by the foot when the team is in motion, and, having been raised, will return to a position to rake as soon as they have passed over the windrow, without any attention from the operator; also, in constructing the teeth and arms so as to dispense with one-half of the number of arms, and yet have the rake-teeth pass over obstructions or irregularities of the surface upon which it operates and rake clean; also, in constructing the teeth and their fastenings, so that they may be easy to repair and cheap to manufacture.

To enable others skilled in the art to make use my invention, I will proceed to describe its construction and operation.

I construct my rake in sections of two teeth, the sections acting independent of each other, mounted upon wheels in the usual manner.

In the accompanying drawings, A A are the shafts; B B, the wheels; C, the axle; D, the teeth-arms; E, the teeth; F F, the elevating-arms; G, the elevating-bar. $e$ is a rod that pivots all the cylinders W and elevating-arms F F to the standards I I I. (Shown in Figs. 1, 2, 3, and 4.) J is the seat. K K are seat-springs attached to the cross-bar X. Y is the platform; Z, the foot-board; L, the hand-lever. $a$ is the hook to hold the lever L down while passing from field to field. H H are connecting-arms of the lever L and elevating-arm F. G, the elevating-bar, is framed to bars F F, (shown in Figs. 1 and 2.) P is the elevator, and may be constructed with one or more arms, which are pivoted to the arms O O' by the pivot $s$. The arms O O' are pivoted to the elevating-bar G and standard T. $n$ is a spur on the end of the elevator P. $b$ is a weight attached to the lever P, (shown in Figs. 1, 3, and 4.) Q is the operating-pitman, which is pivoted to the elevator P by the crank-pin $r$, and is held in position by the screw $c$, which plays in the slot at the top of the pitman Q, (shown in Figs. 3 and 4.)

The cylinders W and the teeth-arms D are fastened together by the bolt $v$ in such a manner that the rod $e$ passes through the cylinder below the bolt $v$, (shown in Fig. 5.)

The teeth E are constructed of wire in the usual form, but are attached to the arms D by means of the pins $i$ and $d$. The teeth are coiled round the block $d$, and the wire passes through the pin $i$, close to the arm D. The block $d$ is bolted to the arm D. Holes are made in the arm D to receive the pin $i$, (shown in Figs. 1, 2, 3, and 4.)

V is a guard attached to the axle C near the wheel B.

Operation: When the rake is in the position represented in Fig. 1, a horse being attached to the shafts and the operator in the seat J, the horse moves forward, and the teeth will collect the hay that comes in contact with them. When the rake becomes loaded and the operator wishes to discharge it, he presses with his foot on the top of the operating-pitman Q, which is pivoted to the crank-pin $r$. This causes the elevator P to suddenly revolve or change from its position as shows in Fig. 1 to the position shown in Fig. 3. The weight $b$ on the end of the elevator P will force the spur $n$ into the earth, and the horse moving forward, the elevator P being pivoted to the arms O O', which connect to the elevating-bar G and standard T, the arms D are all elevated to discharge the hay, as seen in Fig. 4. As the horse moves onward the rake again falls into the same position as it was before it was elevated. Having passed over the hay and moved forward the right distance to leave the hay discharged, it commences raking at the proper place without any attention of the operator. Thus he has the full use of both hands to manage the horse when the rake is operating, which is very desirable.

It will be seen that by this device the labor of discharging the rake is performed by the horse, and is performed without any side draft, as the elevator P is near the center of the rake.

By means of the hand-lever L, the rake can be elevated by operator when the horse is not moving, and by it the rake is kept elevated, while passing from field to field, by means of the hook a.

By the device of attaching two teeth to one arm I am enabled to construct the cylinder W of twice the usual length, thus holding the teeth-arms much firmer on the rod c. The block D holds the coil of the tooth, the block being secured to the arm D by a bolt, and the pin i holds the tooth in the position to rake. Thus if one tooth is injured it may be readily replaced without disturbing the other tooth. The bolt v holds the arm D firmly in the groove of the cylinder W, and the arm may be replaced, if injured, without disturbing the other part of the rake. The guard V, being attached to the axle C and projecting a suitable distance in the rear, holds back or arrests the hay that has come in contact with the wheel B. By this device the rake is kept from clogging by the hay getting entangled in the wheel and the teeth of the rake while being discharged.

What I claim as my invention, and desire to secure by Letters Patent, is—

1. The combination of the elevator P with the crank r and pitman Q, constructed and operating substantially as described, for the purposes set forth.

2. The combination of the arms O O' with the bar G, constructed and operating substantially as described.

3. The combination of the tooth E with the block d, and the pin i, and the arm D, for the purposes set forth.

4. The combination of the cylinder W, the bolt v, and the arm D, for the purposes described.

GEORGE E. BURT.

Witnesses:
 E. A. HILDRETH,
 E. H. BURT.